United States Patent
Patel et al.

(10) Patent No.: US 7,724,894 B2
(45) Date of Patent: May 25, 2010

(54) MAINTAINING LINE VOLTAGE DURING RESET

(75) Inventors: Dipak R. Patel, Hatboro, PA (US); Christopher J. Cotignola, Doylestown, PA (US); Thomas C. Gross, Honey Brook, PA (US)

(73) Assignee: General Instrument Corporation, Horsham, PA (US)

( * ) Notice: Subject to any disclaimer, the term of this patent is extended or adjusted under 35 U.S.C. 154(b) by 1064 days.

(21) Appl. No.: 11/411,696

(22) Filed: Apr. 26, 2006

(65) Prior Publication Data

US 2007/0206776 A1     Sep. 6, 2007

Related U.S. Application Data

(60) Provisional application No. 60/779,517, filed on Mar. 6, 2006.

(51) Int. Cl.
*H04M 1/00* (2006.01)

(52) U.S. Cl. .................................. 379/413; 379/387.01
(58) Field of Classification Search ................. 713/1, 713/2; 379/93.05, 93.06, 387.01, 395.01, 379/399.01, 413
See application file for complete search history.

(56) References Cited

U.S. PATENT DOCUMENTS

| | | | |
|---|---|---|---|
| 6,647,117 B1 * | 11/2003 | Wallace et al. | 379/413 |
| 7,092,517 B2 * | 8/2006 | Prueckelmayer et al. | 379/413 |
| 2005/0212571 A1 * | 9/2005 | Om et al. | 327/143 |

* cited by examiner

*Primary Examiner*—Walter F Briney, III
(74) *Attorney, Agent, or Firm*—Larry T. Cullen

(57) ABSTRACT

A first clock signal is generated by a first circuit and a second clock signal is generated by an auxiliary clock circuit. A switch controls whether the first clock signal or the second clock signal is provided to a subscriber line integrated circuit (SLIC). The SLIC is operable to generate a line voltage within predetermined tolerances on a loop line at a customer premises if the SLIC is receiving the first clock signal or the second clock signal.

22 Claims, 8 Drawing Sheets

MAINTAINING LINE VOLTAGE DURING RESET

PRIORITY

This application claims the benefit of U.S. Provisional Patent Application No. 60/779,517, filed Mar. 6, 2006, and entitled, "MTA Design For Line Voltage Across Reset". The aforementioned provisional patent application is incorporated by reference in its entirety.

BACKGROUND

There are services that a plain old telephone system (POTS) can sustain while executing many sorts of system maintenance. One of these services is the ability to maintain loop line voltage at a customer premises to keep customer premise equipment (CPE) devices operating and unaffected by the system maintenance.

A subscriber line circuit in a plain old telephone system (POTS) is a circuit connecting a subscriber line at a customer premises to the central office. The subscriber line is traditionally a twisted-pair loop for carrying analog voice. Today, the subscriber line is also used for digital services as well, such as provided via cable, DSL or satellite.

Customer premise equipment (CPE) devices, such as phones, facsimiles, home security systems, answering machines, etc., connected to the subscriber line at the customer premises may depend on the line voltage of the subscriber line for proper operation. For example, an alarm system at a customer premises monitors the line voltage. If the line voltage falls below a threshold for a predetermined period of time, the alarm system assumes the subscriber line has been cut, and sends an alarm message to a remote monitoring station. In addition, the alarm system activates a loud, local alarm siren, which can wake everyone in the middle of the night for a false alarm if the line voltage falls below a threshold in the middle of the night.

The POTS has the ability to maintain line voltage to keep the CPE devices operating and unaffected when system maintenance is performed, such as software downloads and upgrades, system reboots, and system re-configurations. However, the ability to maintain line voltage during system maintenance may not be supported by a multimedia terminal adaptor (MTA) for a voice-over-internet-protocol (VoIP) network. VoIP is a digital telephone service that may be provided using the subscriber home wiring and typically replaces conventional POTS service provided by a telephone company. VoIP may be deployed at the customer premises via the MTA. The MTA interfaces with an IP network and is operable to adapt VoIP data for use by CPE devices connected to the subscriber line via the home wiring. The MTA may be embedded in a modem, such as a cable modem or DSL modem, as an embedded MTA (eMTA) or may be provided as a standalone device connected to the modem.

When maintenance is performed on the modem or MTA, which may include software downloads, correcting a lock-up situation or other maintenance, the line voltage on the subscriber line may drop because the MTA does not include the ability to maintain the line voltage when being reset. This may result in failure or improper operation of a CPE device. For example, if the line voltage falls below a threshold for a predetermined period of time, the alarm system assumes the subscriber line has been cut, and sends a false alarm to the remote monitoring station. Furthermore, scheduled system maintenance is typically performed during non-peak hours, such as late at night. Thus, a false alarm caused by the scheduled maintenance may appear real, because home robberies mostly occur during the late night hours.

SUMMARY

According to an embodiment, a first clock signal is generated by a first circuit and a second clock signal is generated by an auxiliary clock circuit. A switch controls whether the first clock signal or the second clock signal is provided to a subscriber line integrated circuit (SLIC). The SLIC is operable to generate a line voltage within predetermined tolerances on a loop line at a customer premises if the SLIC is receiving the first clock signal or the second clock signal.

The first circuit may include a processor. If the processor goes into reset, the SLIC conventionally is unable to generate a line voltage on the loop line. This may cause CPE devices to fail or operate incorrectly, such as generating a false alarm if the CPE device includes an alarm system. According to an embodiment, the auxiliary clock circuit may be used to generate the clock signal for the SLIC if the processor goes into reset, thus allowing the SLIC to maintain the line voltage on the loop line.

According to another embodiment, a method of controlling a clock signal for a SLIC in a multimedia terminal adaptor includes receiving a first clock signal at a SLIC. If a soft reset is detected, the clock signal for the SLIC is switched from the first clock signal to a second clock signal generated by an auxiliary clock circuit. The SLIC is able to generate a line voltage within predetermined tolerances on a loop line at a customer premises if the SLIC is receiving the first clock signal or the second clock signal.

BRIEF DESCRIPTION OF THE DRAWINGS

Embodiments are illustrated by way of example and not limited in the following Figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Figure 1:
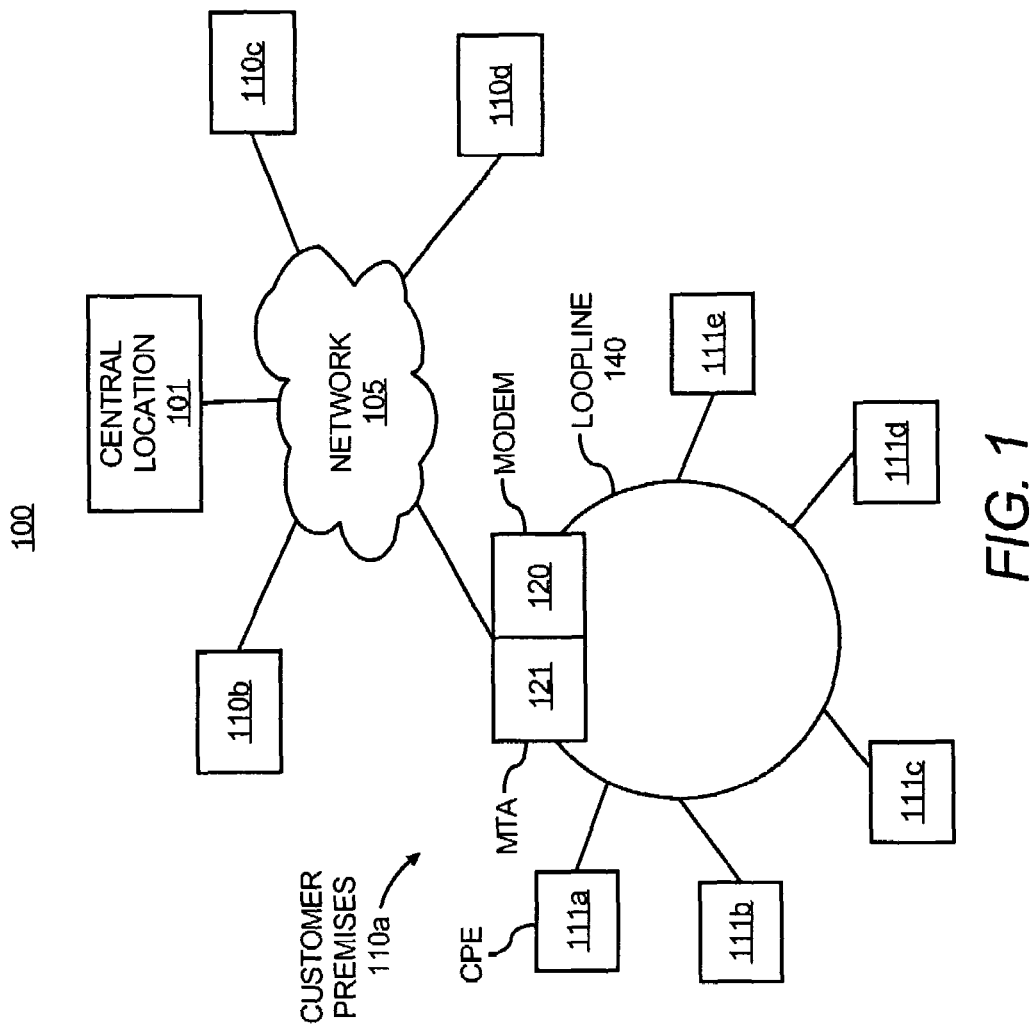
FIG. 1 illustrates a system, according to an embodiment.

FIG. 1 illustrates a system 100, according to an embodiment. The system 100 includes a central location 101 transmitting digital content to a plurality of customer premises 110a-n via a network 105. The central location 101 may include a cable head-end or a central office connected to a cable head-end providing communication services to the customer premises 110a-n. The network 105 may include an IP network for providing digital communication services. The digital communication services may include a high-speed Internet connection, cable television, VoIP, and satellite services, etc.

The customer premises 110a-n may each include a modem and an MTA providing VoIP services. For example, the customer premise 110a is shown with a modem 120 having an MTA 121. Although not shown, one or more of the remaining customer premises 110b-n may include a modem and an MTA. The MTA 121 may be embedded in the modem 120 or provided as a standalone device connected to the modem 120. In one embodiment, the modem 120 is a cable modem. However, the modem 120 may include a DSL modem, satellite modem, or other types of modems. The modem 120 is operable to receive digital data from the central location 101 for use at the customer premises 110a. The digital data may include digital audio, digital video, data downloaded from the Internet, etc. The MTA 120 provides VoIP services for the customer premises 110a, as described in further detail below.

One or more CPE devices 111a-e may be connected to the twisted pair loop, referred to as the loop line 140 at the customer premises 110a. The loop line 140, for example, is a twisted pair copper subscriber line at the customer premises 110a. Examples of CPE devices include phones, home security systems, answering machines, facsimiles, and others. According to an embodiment, the MTA 121 is operable to maintain the line voltage on the loop line 140 during system maintenance, which allows the CPE devices 111a-e that utilize the line voltage to maintain normal operation during system maintenance.

Figure 2A:
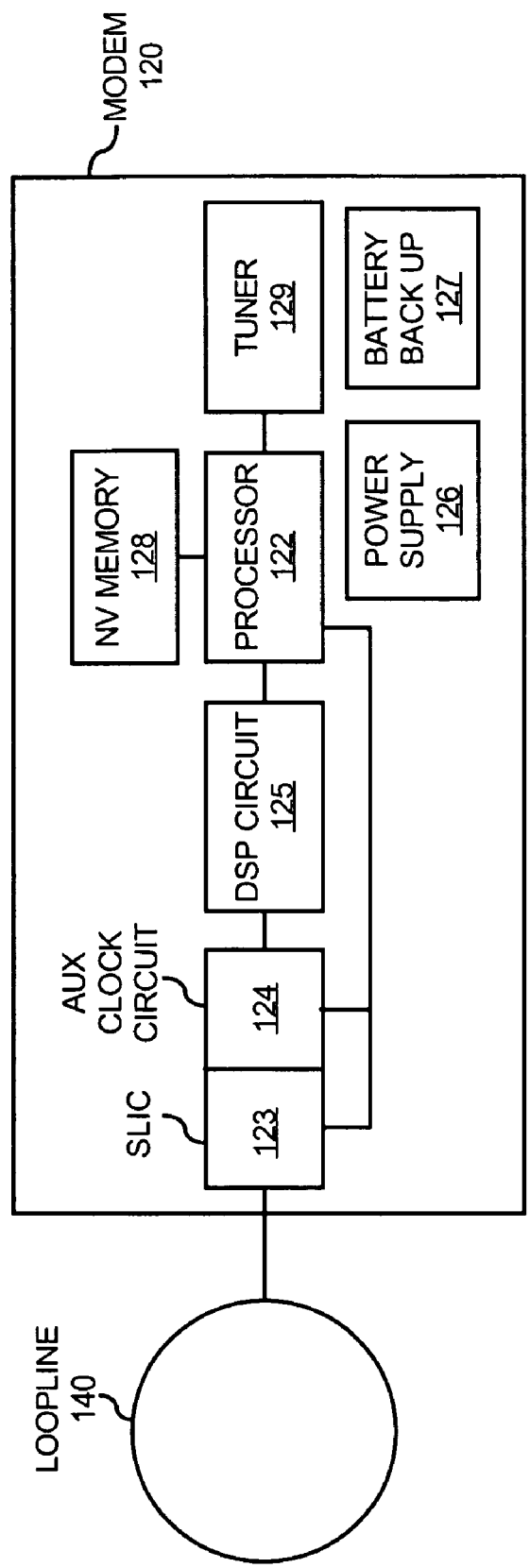
FIG. 2A illustrates a block diagram of a modem with an eMTA, according to an embodiment.

FIG. 2A illustrates a block diagram of the modem 120 with eMTA, according to an embodiment. The modem 120 includes a tuner 129, a digital signal processing (DSP) circuit 125, a processor 122, a subscriber line integrated circuit (SLIC) 123, an auxiliary clock circuit 124, nonvolatile memory 128, a power supply 126, and a battery-backup 127. The modem 120 receives the digital data sent via the network 105 shown in FIG. 1 and demodulates and formats the data for transmission on the loop line 140 and for use by the customer premises equipment. For example, if the system 100 represents a cable network architecture, the processor 122 tunes the tuner 129 to receive high frequency cable (HFC) signals on predetermined channels carrying digital data, and the signals are demodulated as is known in the art. The DSP circuit 125 converts the received signals to frames for each channel. The processor 123 may be a cable modem processor or other type of processor depending on the type of modem.

The SLIC 123 emulates the functions of a telephony central office, as is known in the art, for providing VoIP services. The SLIC 123 is provided in an MTA, which may be embedded in the modem 120, such as shown in FIG. 2A. One function performed by the SLIC 123 is generating a line voltage on the loop line 140, which is typically provided by a telephone central office to a customer premises, such that the customer premises equipment can function properly. For example, on-hook and off-hook voltages, also referred to as tip and ring voltages, are generated by the SLIC 123. The SLIC 123 generates a line voltage, which may include a tip voltage or a ring voltage, within predetermined tolerances.

Conventionally, the line voltage of the loop line 140 may fall outside of a predetermined tolerance during a soft reset because the SLIC 123 is unable to generate the proper line voltage during the soft reset. A soft reset is when power is maintained to a modem with an eMTA, such as the modem 120, or to a standalone MTA, but a processor for the MTA, such as the processor 122, is reset. During a reboot or another type of reset, the power is maintained to the processor 122. The soft reset is different than a power cycle. A power cycle may be performed when power is not maintained. For example, a power cycle is performed during power up, after the modem 120 or MTA is off for an extended period. A soft reset may be caused by a software download to the modem 120 or other factors. During a soft reset, when power is maintained to the modem 120, firmware and/or hardware executes a reset of the processor 122 and other components of the modem 120.

The SLIC 123 needs a clock signal to generate the line voltage for the loop line 140. During a soft reset, a clock signal may not be provided to the SLIC 123 from the processor 122 if the processor 122 is in reset for architectures where the SLIC 123 receives the clock signal from the processor 122. According to an embodiment, the auxiliary clock circuit 124 generates a clock signal for the SLIC 123 when a soft reset occurs. Thus, even if the processor 122 is in reset, the SLIC 123 generates the line voltage for the loop line 140 because the SLIC 123 is receiving a clock signal from the auxiliary clock circuit 124. Thus, the SLIC 123 is able to maintain the line voltage of the loop line 140 within the predetermined tolerances during the soft reset.

For architectures where a clock circuit, instead of the processor 122, generates the clock signal for the SLIC 123 when the modem is not reset, the clock circuit may also cease generating a clock signal during a soft reset. For these architectures, the auxiliary clock circuit 124 generates a clock signal for the SLIC 123 when a soft reset occurs, such as described above with respect to the embodiment where the processor 122 generates the clock signal for the SLIC 123.

The modem 120 also includes a nonvolatile (NV) memory 128. According to an embodiment, the NV memory 128 stores calibration data that is generated when the modem 120 with an eMTA or when a standalone MTA is powered up. A calibration is typically performed by every modem and MTA after a power-up. The calibration procedure generates calibration data including current measurements, voltage measurements, and/or other data as is known in the art which is needed for the calibration. The calibration data for different modems is different, because the circuit components used for each modem may have slight variances.

Typically, the calibration data is not saved after the calibration. According to an embodiment, the calibration data is saved in the NV memory 128, so the calibration data may be loaded into the SLIC 123 by the processor 122 when the SLIC 123 is initialized after a soft reset without requiring the processor 122 to perform another calibration procedure to generate the calibration data. Thus, the SLIC 123 can be initialized faster after a soft reset, because the calibration data is loaded into the SLIC 123 from the NV memory 128 by the processor 122 rather than having to perform the calibration again. Also, the SLIC 123 may not be able to maintain the line voltage of the loop line 140 shown in FIG. 1 when initializing. However, the line voltage may be brought within the predetermined tolerances in a much shorter period of time by loading the SLIC 123 with the calibration data from the NV memory 128. Also, the NV memory 128 may store error checking data, such as a checksum, to determine whether the calibration data stored in the NV memory 128 is valid before loading into the SLIC 123.

The modem 120 includes a power supply 126 and may include a battery-backup 127 operable to supply power to the components of the modem 120. In one embodiment, the auxiliary clock circuit 124 generates a clock signal for the SLIC 123 only when needed, instead of continuously generating a clock signal. Thus, power is conserved. This is especially beneficial if the battery-backup 127 is supplying power to the modem 120 instead of the main power supply 126, so as not to consume the limited amount of power available via the battery-backup 127. It will be apparent to one of ordinary skill in the art that in other embodiments, the auxiliary clock circuit 124 may be designed to generate a clock signal continuously or even when not needed, however, only a clock signal from a single source is provided to the SLIC 123 at any given time.

Figure 2B:
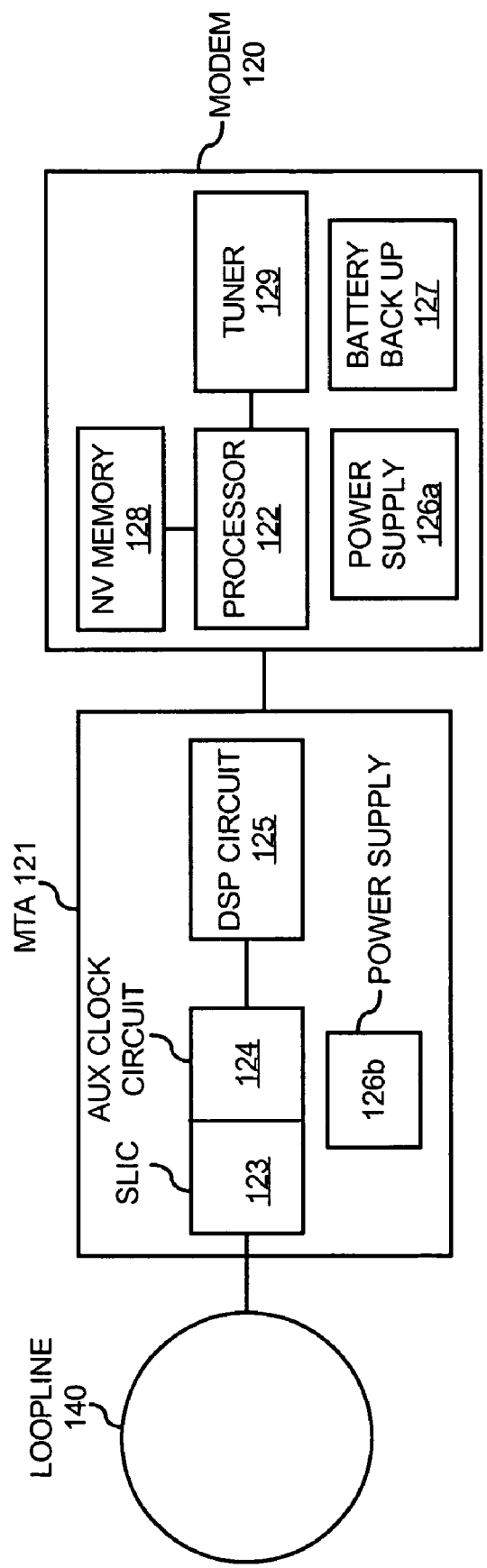
FIG. 2B illustrates a block diagram of a modem and a standalone MTA, according to an embodiment.

FIG. 2B illustrates a standalone MTA 121 connected to a modem 120a, according to an embodiment. The standalone MTA 121 and the modem 120a include a tuner 129, a DSP circuit 125, a processor 122, a SLIC 123, an auxiliary clock circuit 124, nonvolatile memory 128, a power supply 126a for the standalone MTA 121, a power supply 126b for the modem 120, and battery-backup 127 for the modem 120. The circuits in the standalone MTA 121 and the modem 120 function as described above with respect to FIG. 2A.

It will be apparent to one of ordinary skill in the art that the modems and MTAs shown in FIGS. 2A-B may include more components and more connections between components than shown. Simplified block diagrams are shown to illustrate the embodiments.

Figure 3:
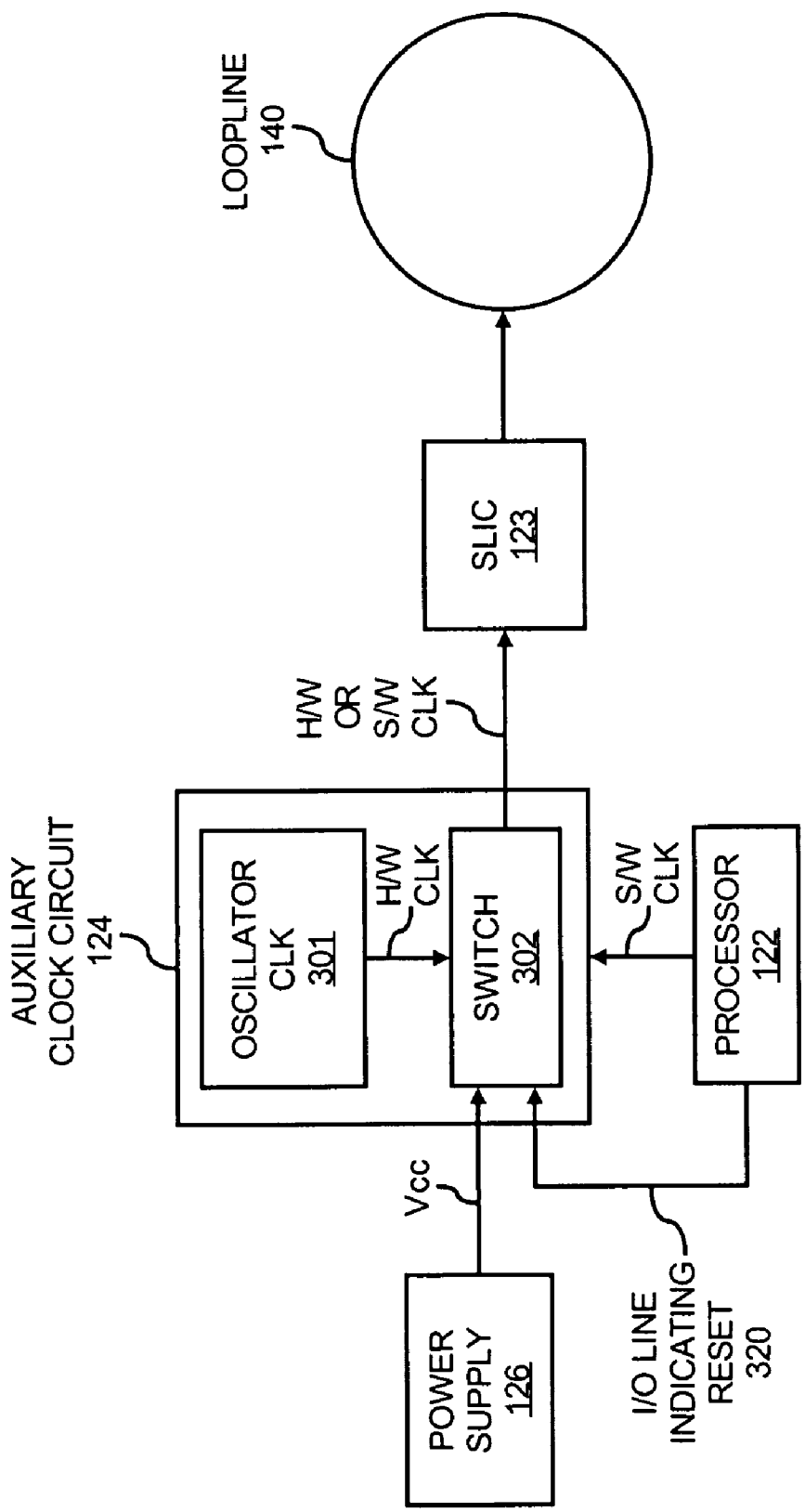
FIG. 3 illustrates a block diagram of an auxiliary clock circuit, according to an embodiment.

FIG. 3 illustrates a block diagram of the auxiliary clock circuit 124, according to an embodiment. The auxiliary clock circuit 124 includes an oscillator circuit 301 generating a clock signal at a desired frequency, shown as hardware (H/W) CLK. The auxiliary clock circuit 124 also includes a switch 302 controlling whether the SLIC 123 receives a clock signal from the processor 122 or the oscillator circuit 301. For example, the switch 302 enables the clock signal from the processor 122, shown as software (S/W) CLK, for the SLIC 123 if the processor 122 is not in reset, which may be detected by using an I/O line 320 of the processor 122. The SLIC 123 is operable to maintain the line voltage for the loop line 140 when receiving a clock signal from either the auxiliary clock circuit 124 or the processor 122.

Figure 4A:
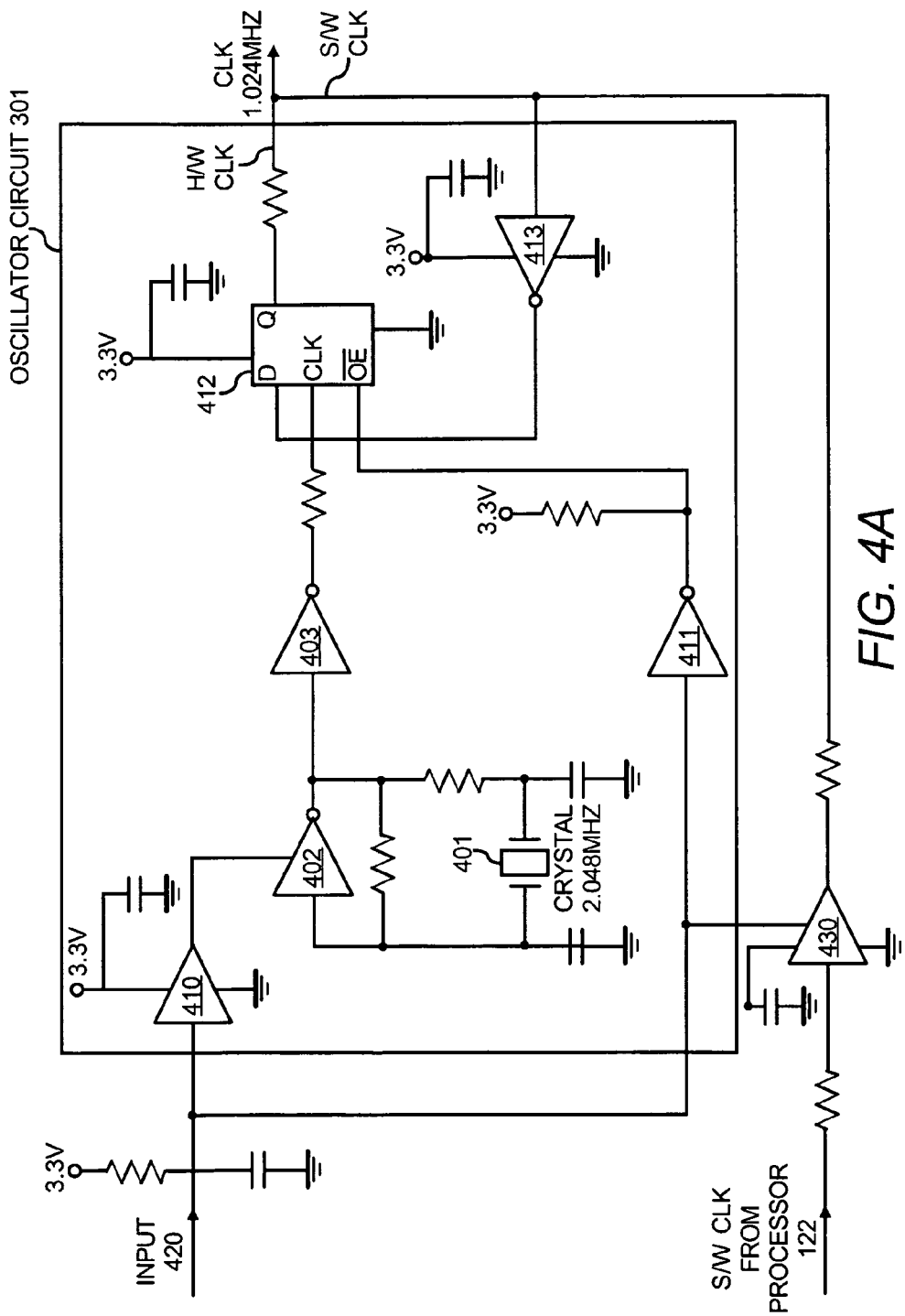
FIG. 4A illustrates a schematic diagram of the auxiliary clock circuit, according to an embodiment.

FIG. 4A illustrates a schematic diagram of the auxiliary clock circuit 124, according to an embodiment. The oscillator circuit 301 of the auxiliary clock circuit 124 includes an input 420 receiving the I/O line 320 of the processor 122 that indicates whether the processor 122 is in reset. If the input 420 indicates that the processor 122 is in reset, then the oscillator circuit 301 generates a clock signal for the SLIC 123.

The buffer 430 performs the functions of the switch 302 shown in FIG. 3. The buffer 430 shown in FIG. 4 is enabled to output the clock signal from the processor 122 if the processor 122 is not in reset. If the processor 122 is in reset, then the buffer 430 is not enabled and the clock signal generated from the oscillator circuit 301 is output to the SLIC 123.

The oscillator circuit 301 shown in FIG. 4A is one example of a well known oscillator circuit that may be used to generate a clock signal of desired frequency. Other well known oscillator circuits may alternatively be used. The oscillator circuit 301 includes a crystal 401, inverters 402, 403 and 413 and D/Q flip flop 412. The crystal 401, inverters 402 and 403, and the resistors connected to the inverters 402, 403 and 413 generate a clock signal at the frequency of the crystal 401. For example, a clock signal is generated at 2.048 MHz. The desired frequency of the clock signal to be output to the SLIC 123 is 1.024 MHz. Thus, the D/Q flip flop 412, the inverters 411 and 413 and resistors shown divide the 2.048 MHz by 2. The inverter 411 is provided to enable the D/Q flip flop 412 if the processor 122 is in reset and Vcc is, for example, 3.3V. If a crystal is available that can provide a clock signal at the desired frequency, the D/Q flip flop 412 and other components for dividing the frequency may not be needed. It will be apparent to one of ordinary skill in the art that an oscillator circuit may be used for providing a clock signal at a frequency other than 1.024 MHz, depending on the needs of the components of the modem or MTA.

Figure 4B:
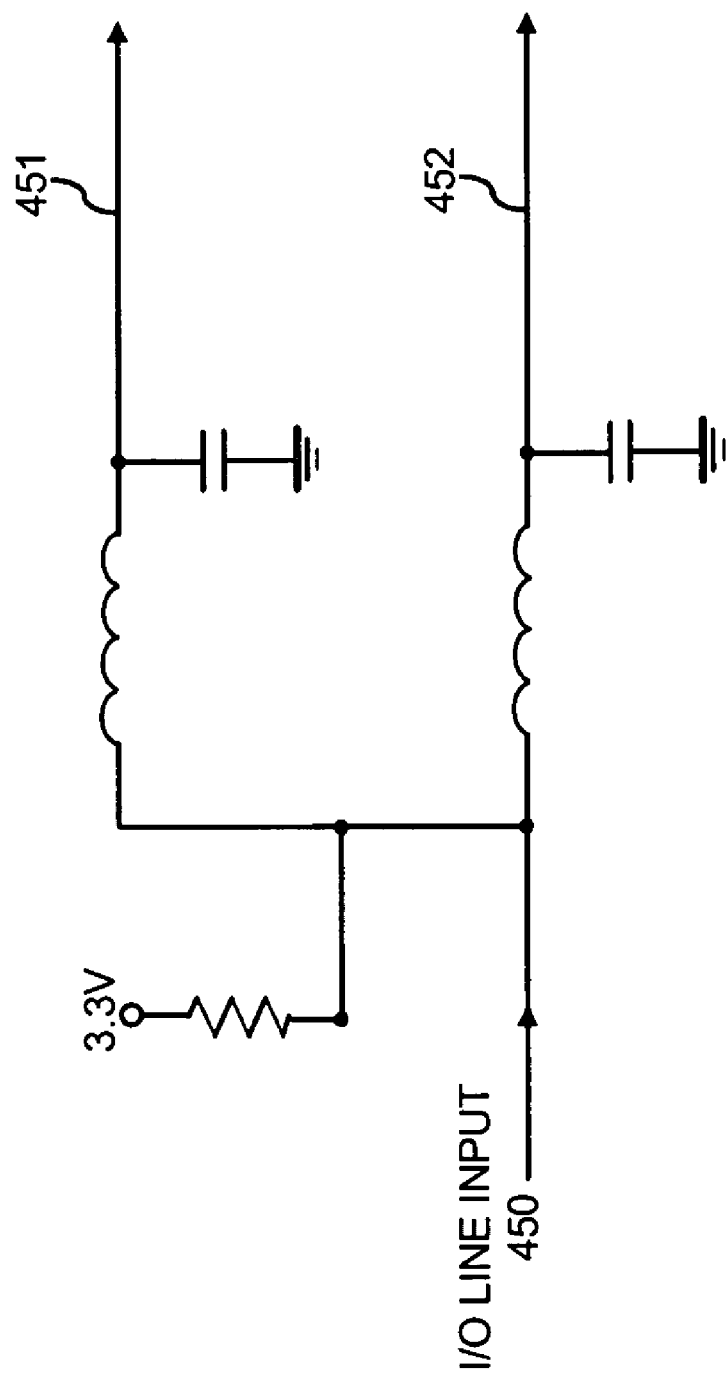
FIG. 4B illustrates a schematic diagram of a SLIC reset circuit, according to an embodiment.

FIG. 4B illustrates a schematic of a SLIC reset circuit, according to an embodiment. The SLIC reset circuit is used to reset the SLIC 123 when switching from the clock generated by the oscillator circuit 301 to the clock generated by the processor 122 after the processor 122 comes out of reset. For example, after switching to the clock generated by the processor 122 and after the processor 122 comes out of reset, the SLIC 123 may be locked up and does not respond to the processor 122. Thus, the processor 122 resets the SLIC 123 using the SLIC reset circuit. The SLIC reset circuit includes an input 450 from the processor 122. The input 450 may be connected to an I/O line from the processor 122 that indicates when to reset the SLIC 123. The outputs 451 and 452 of the SLIC reset circuit are connected to the SLIC 123 for resetting the SLIC 123 when enabled.

After reset of the processor 122, the SLIC 123 is initialized. For example, the processor 122 loads the calibration data stored in the NV memory 128 shown in FIG. 2A into the SLIC 123 to initialize the SLIC 123. During initialization, the SLIC 123 may not maintain the line voltage on the loop line 140. However, using the calibration data stored in the NV memory 128 minimizes the initialization time to an acceptable amount, such as less than 500 ms.

Figure 5A:
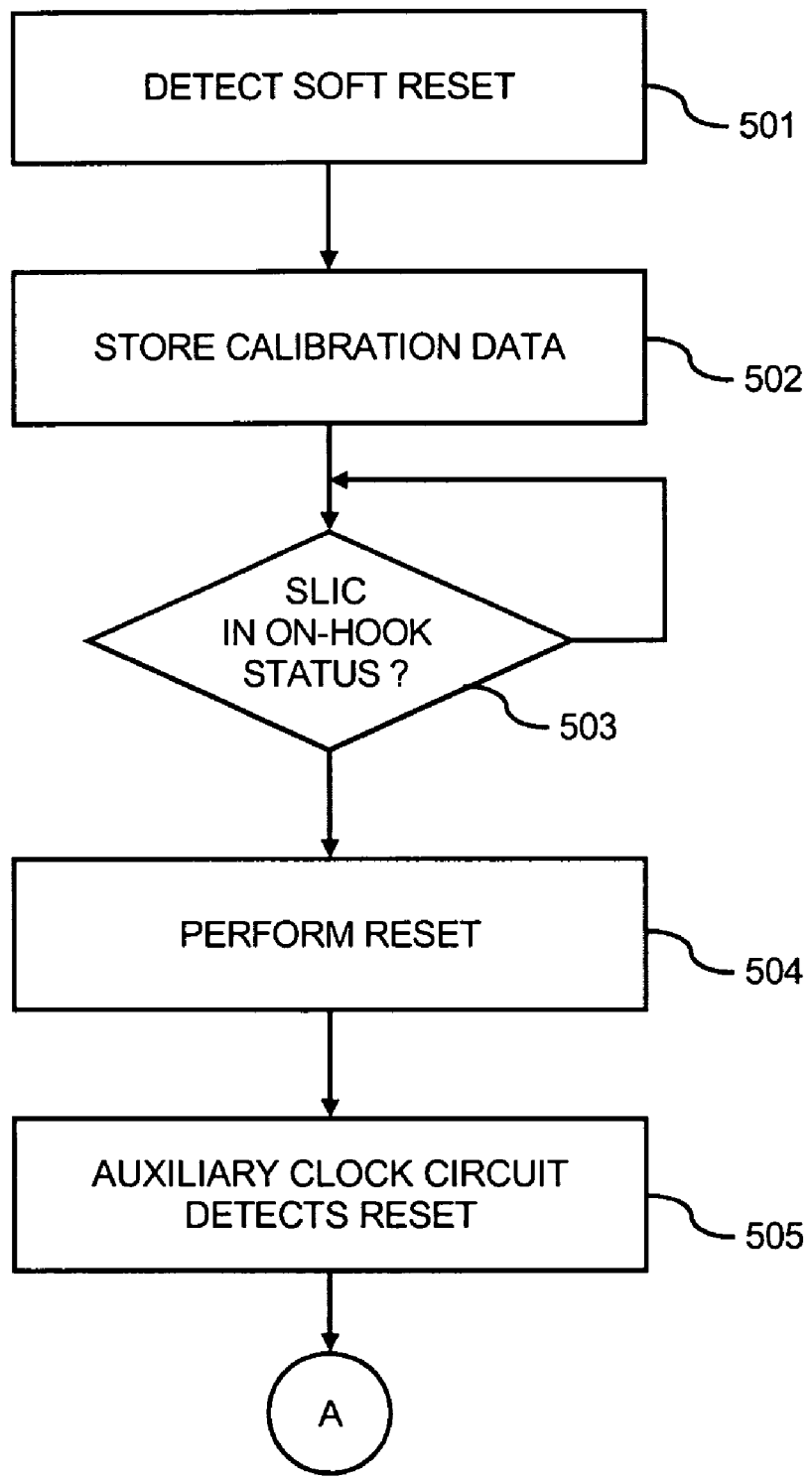
FIGS. 5A-B illustrates a flow chart of a method for maintaining line voltage during a soft reset, according to an embodiment.
Figure 5B:
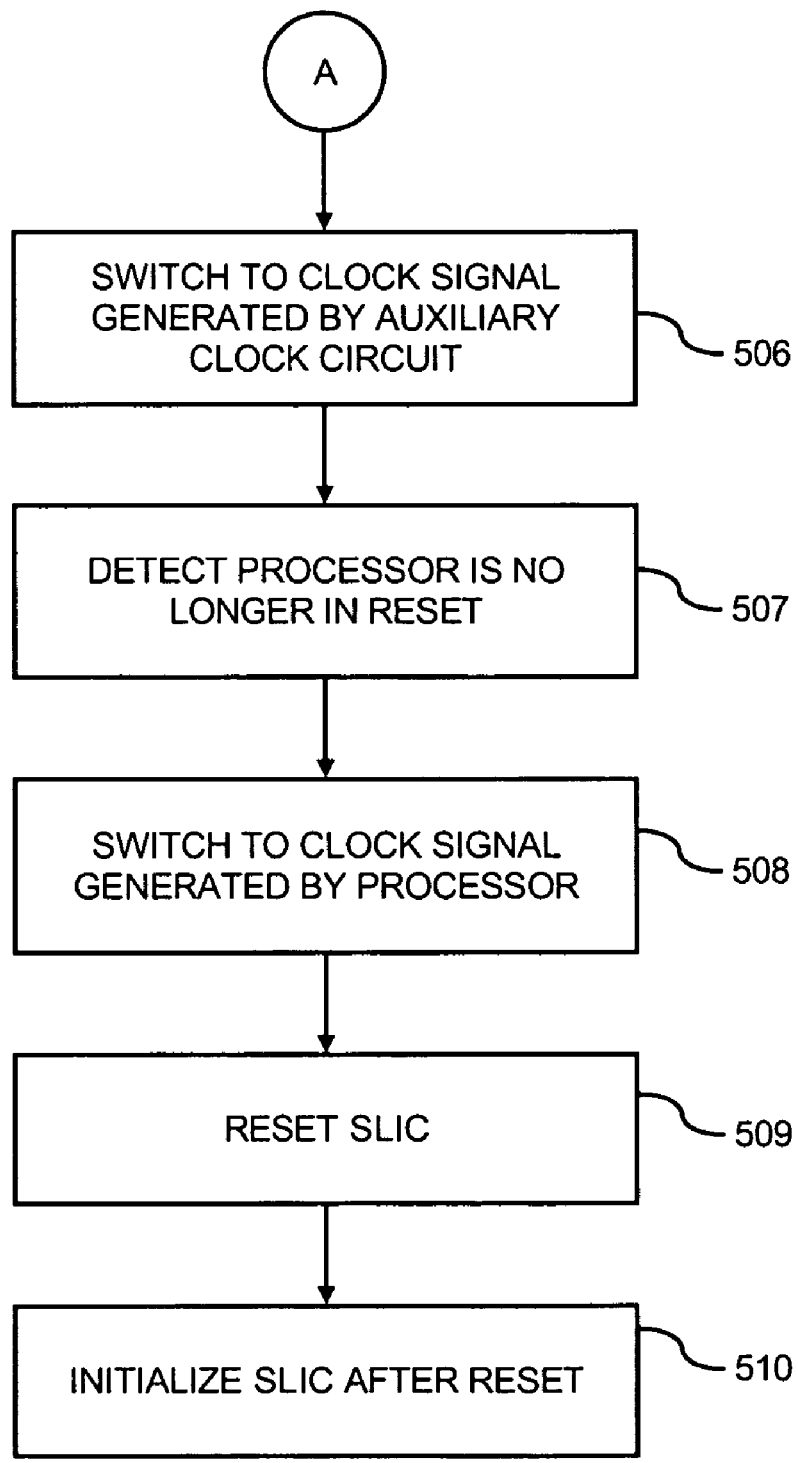

FIGS. 5A-B illustrates a method 500 for providing a clock signal to a SLIC during a soft reset to maintain line voltage, according to an embodiment. The method 500 is described with respect to FIGS. 1-4B by way of example and not limitation.

At step 501, a soft reset is detected. For example, the processor 122 shown in FIG. 2A detects a soft reset.

At step 502, the processor 122 stores the SLIC calibration data in the NV memory 128. Calibration data may include current measurements, voltage drop measurements, and other known calibration data that is needed for proper performance of the modem 120. Typically, during power-up, calibration is performed and the calibration data is stored in FLASH or other volatile memory. The calibration data may be overwritten with new calibration data when a new calibration is performed. At step 502, the calibration data is copied to NV memory 128, so that the calibration data may be quickly loaded when initializing the SLIC 123 after a soft reset.

At step 503, the processor 122 determines whether the SLIC 123 is in on-hook status. If on-hook status is detected, the processor 122 performs a reset at step 504. If talk mode, also known as off-hook status, is detected, the processor 122 waits until on-hook status is detected before executing a reset, so as not to drop a call in progress. The processor is reset at the step 504. This may include returning to a default state. Clearing registers and other functions for returning to the default state may be performed by the processor 122 executing the reset.

At step 505, the auxiliary clock circuit 124 detects the soft reset. For example, the auxiliary clock circuit 124 is connected to the I/O line of the processor 122, shown as 420 in FIG. 4A, to detect that the processor 122 is in reset.

At step 506, the auxiliary clock circuit 124 controls the switch 301 shown in FIG. 3 to switch to a clock signal generated by the auxiliary clock circuit 124 instead of a clock signal generated by another circuit, such as the clock signal generated by the processor 122. Using the switch 301 prevents the SLIC 123 from receiving two clock signals. Thus, after the soft reset is detected, the SLIC 123 receives the clock signal from the auxiliary clock circuit 124 instead of the processor 122. When providing a clock signal to the SLIC 123 when the processor 122 is in reset, the SLIC 123 is able to maintain the line voltage on the loop line 140.

At step 507, the auxiliary clock circuit 124 detects that the processor 122 is no longer in reset. For example, the auxiliary clock circuit 124 detects a low impedance state of the I/O line from the processor 122 to determine that the processor 122 is not in reset.

At step 508, the auxiliary clock circuit 124 controls the switch 301 shown in FIG. 3 to switch to a clock signal generated by a circuit, such as the processor 122, other than the auxiliary clock circuit 124.

At step 509, the processor 122 resets the SLIC 123, for example, using the SLIC reset circuit shown in FIG. 4B.

At step 510, the SLIC 123 is initialized after the soft reset. During initialization, the processor 122 loads the SLIC 123 with the calibration data determined at step 501. After initialization, the SLIC 123 resumes normal operation and generates the line voltage on the loop line 140.

One or more of the steps of the method 500 and other steps described herein and software described herein may be implemented as software embedded or stored on a computer readable medium, such as the NV memory 128 shown in FIGS. 2A-B or other storage. Steps of detecting a soft reset, generating a signal indicating a soft reset for switching to a clock signal generated by the clock circuit 124 shown in FIGS. 2A-B, and steps for initialization the SLIC 123 are some examples of steps may be performed or initiated by software. The steps may be embodied by a computer program, which may exist in a variety of forms both active and inactive. For example, they may exist as software program(s) comprised of program instructions in source code, object code, executable code or other formats for performing some of the steps when executed. Modules include software, such as programs, subroutines, objects, etc. Any of the above may be stored on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated herein may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. An apparatus comprising:
   a first clock signal generated by a first circuit;
   a second clock signal generated by an auxiliary clock circuit;
   a subscriber line integrated circuit (SLIC) generating a line voltage on a loop line if the SLIC is receiving the first clock signal or the second clock signal;
   a switch controlling whether the SLIC receives the first clock signal or the second clock signal based on whether a soft reset is detected.

2. The apparatus of claim 1, wherein the switch switches to the first clock signal if a soft reset is not detected and switches to the second clock signal if the soft reset is detected.

3. The apparatus of claim 2, wherein the first circuit is a processor and the soft reset is detected by the processor.

4. The apparatus of claim 3, wherein the SLIC is reset by the processor and initialized after the soft reset using calibration data copied to nonvolatile memory.

5. The apparatus of claim 4, wherein the nonvolatile memory stores error checking data for the calibration data, and the SLIC determines whether the calibration data is valid using the error checking data.

6. The apparatus of claim 3, wherein the switch comprises a buffer that outputs the first clock signal only if the buffer is enabled, wherein the buffer is enabled if the processor is not in reset.

7. The apparatus of claim 3, wherein the auxiliary clock circuit comprises an oscillator circuit that is enabled only if the processor is in reset.

8. The apparatus of claim 2, wherein the processor performs a reset if the soft reset is detected and the SLIC is in an on-hook status, the processor reset causing the switch to switch to the second clock signal.

9. The apparatus of claim 1, wherein the apparatus comprises a modem with an embedded multimedia terminal adaptor.

10. The apparatus of claim 1, wherein the apparatus comprises a standalone multimedia terminal adaptor.

11. A modem with an embedded multimedia terminal adaptor comprising:
    a processor operable to generate a first clock signal and control functions of the modem;
    an auxiliary clock circuit means for generating a second clock signal;
    a switch means for switching between the first clock signal and a second clock signal based on whether a soft reset is detected; and
    a SLIC operable to generate a line voltage on a loop line if the SLIC means is receiving either the first clock signal or the second clock signal.

12. The modem of claim 11, further comprising:
    nonvolatile storage operable to store calibration data for the SLIC, wherein the calibration data is generated during power-up of the modem; and
    the processor is operable to reset the SLIC and load the calibration data in the SLIC during initialization of the SLIC after the soft reset.

13. The modem of claim 11, further comprising:
    a power supply operable to supply power to the modem; and
    a battery back-up operable to supply power to the modem as a back-up to the power supply, wherein the auxiliary clock circuit means is operable to generate the second clock signal when the processor is in reset so as not to consume power from the power supply or the battery back-up when the processor is not in reset.

14. A method of controlling a clock signal for a SLIC in a multimedia terminal adaptor, the method comprising:
    receiving a first clock signal at a SLIC;
    detecting a soft reset;
    switching from the first clock signal to a second clock signal generated by an auxiliary clock circuit in response to detecting the soft reset; and
    receiving the second clock signal at the SLIC, wherein the SLIC generates a line voltage within predetermined tolerances on a loop line at a customer premises if the SLIC is receiving the first clock signal or the second clock signal.

15. The method of claim 14, further comprising:
    switching from the second clock signal to the first second clock signal after a processor providing the first clock signal to the SLIC comes out of reset.

16. The method of claim 15, further comprising:
    receiving a signal resetting the SLIC; and
    initializing the SLIC.

17. The method of claim 16, wherein initializing the SLIC further comprises:
    loading calibration data from a non-volatile memory into the SLIC, wherein the calibration data was generated during power-up of the multimedia terminal adaptor and later copied to the non-volatile memory.

18. The method of claim 16, wherein the processor detects the soft reset and the method further comprises:
    performing a reset at the processor if the soft reset is detected and the SLIC is in an on-hook status; and
    switching from the first clock signal to a second clock signal comprises switching from the first clock signal to the second clock signal in response to the processor performing the reset.

19. The method of claim 18, further comprising:
    generating the second clock signal by the auxiliary clock circuit only if the processor is in reset.

20. A computer readable medium storing one or more computer programs including instructions that when executed perform a method of controlling a clock signal for a SLIC in a multimedia terminal adaptor, wherein the SLIC is operable to receive a first clock signal from a first circuit and the SLIC is operable to generate a line voltage within predetermined tolerances on a loop line at a customer premises if the SLIC is receiving the first clock signal, the method comprising:
    detecting a soft reset; and
    generating a signal used to switch from the first clock signal to a second clock signal generated by an auxiliary clock circuit in response to detecting the soft reset, such that the second clock signal is provided to the SLIC instead of the first clock signal and the SLIC is operable to generate the line voltage within the predetermined tolerances on the loop line at the customer premises if the SLIC is receiving the second clock signal.

21. The computer readable medium of claim 20, wherein the first circuit comprises a processor generating the first clock signal, and the method further comprises:
    performing a reset at the processor if the soft reset is detected and the SLIC is in an on-hook status.

22. The computer readable medium of claim 21; wherein the method further comprises:
    generating a signal resetting the SLIC; and
    loading calibration data from a non-volatile memory into the SLIC, wherein the calibration data was generated during power-up of the multimedia terminal adaptor and copied to the non-volatile memory.

* * * * *